June 16, 1964   J. A. KAYSER   3,137,148
FLEXIBLE COUPLING

Filed Sept. 22, 1960   2 Sheets-Sheet 1

INVENTOR.
JOHN A. KAYSER
BY Walter E. Pavlick
ATTORNEY

United States Patent Office 3,137,148
Patented June 16, 1964

3,137,148
FLEXIBLE COUPLING
John Anthony Kayser, Toledo, Ohio, assignor to Dana Corporation, Toledo, Ohio, a corporation of Virginia
Filed Sept. 22, 1960, Ser. No. 57,703
3 Claims. (Cl. 64—11)

This invention relates to flexible shaft couplings and a method for making the same and more particularly to a flexible shaft coupling wherein resilient means are disposed between telescoping spaced inner and outer metallic members in a condition affording a drive between the metallic members.

Flexible couplings of the character mentioned have many uses, especially in motor driven vehicles where there is an increased demand for elimination of excessive wear and vibration in the system employed to transmit power from the engine to the wheels.

Heretofore, in these flexible couplings wherein relative angular movement of the coupled tubular members is resisted by the tension of a resilient means, the resilient means either has been vulcanized to the respective tubular members or it has been compressed between the tubular members so as to engage the latter strongly by friction. Vulcanizing the rubber within the tubular members is a difficult and frequently unsatisfactory operation. Moreover, since the resilient means is vulcanized to the tubular members themselves, the bulky tubular members most often have to be shipped to another plant to receive the vulcanizing process and therefore the cost of the completed structure is greatly increased. Where the rubber engages the tubular member solely by friction there is such a difference in area between the resilient means-engaging surfaces of the inner and outer tubular members that slippage invariably occurs between the resilient means and the inner sleeve, and before the tubular members have turned relatively of each other a satisfactory distance.

It is an object of this invention to prevent, by the use of resilient means associated with the propeller shaft, the transmission of torque vibrations from the engine to the rear axle.

Another object of this invention is to prevent rear axle noises, such as may result from faulty gear engagement, from being transmitted to the change speed transmission in the body through the propeller shaft.

Another object of this invention is the avoidance of transmission rattle resulting from propeller shaft whip or other vibratory movements in the transmission line.

A further object of this invention is to provide a flexible connection in which resilient means, such as rubber, is fixed, as by vulcanizing over a large area of contact, to metal elements each of which is adapted to be secured to one of the connected members so that a secure mechanical connection is effected between the sub-assembly therefor and the one member.

A further object of this invention is to provide a flexible coupling composed of a plurality of individually mounted resilient elements so that the spring rate of the flexible coupling may be readily varied by the addition or subtraction of resilient elements.

A still further object of this invention is to provide a method of manufacturing flexible couplings which reduces manufacturing and shipping costs.

In one preferred embodiment of this invention the flexible coupling is constructed by forming a plurality of resilient annuluses on separate metallic rings, assembling the desired number of separate metallic rings on the inner member of a pair of telescoping members, fixedly securing the rings to the inner of the telescoping members, and positioning the inner member in telescoping relation with the outer member by compressing the resilient annuluses so as to form a frictional bond with the outer member.

These and other objects of this invention will become apparent from the following detailed description when taken in connection with the accompanying drawings wherein.

Figure 4:
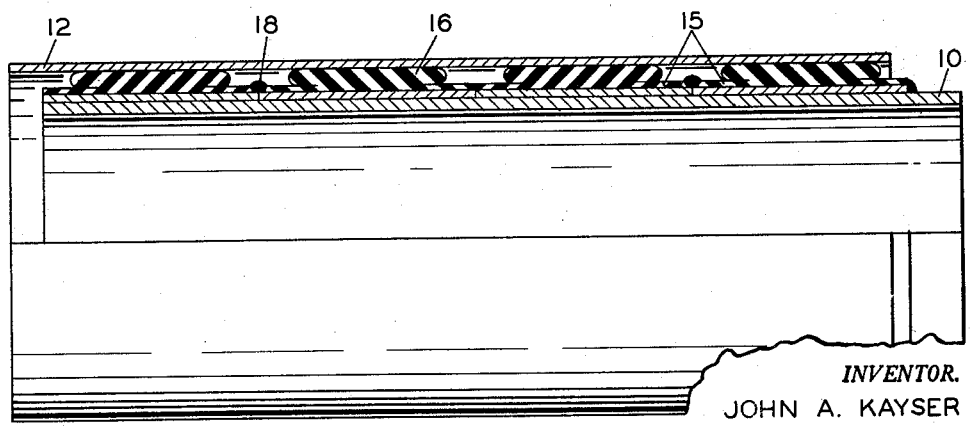
FIG. 4 is an elevational view partly in section showing the inner tubular member with the sleeve rings assembled thereon after it is telescoped within the outer tubular member.

Referring to the drawings and more particularly to FIG. 4, the resilient or flexible connection comprises an inner metallic tubular member 10 telescopically received within and spaced from an outer metallic tubular member 12. A plurality of elements or sleeve rings 14 are fixedly secured to the inner tubular member 10 and each has a resilient annulus 16 formed thereon. The resilient annuluses 16 are compressed between the inner tubular member 10 and the outer tubular member 12 to form a frictional bond with the outer tubular member so that torque may be transmitted between the inner and outer tubular members 10 and 12 through the resilient annuluses 16.

Figure 1:
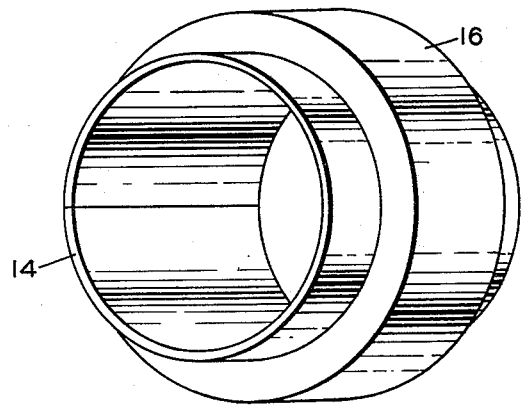
FIG. 1 is a perspective view of a sleeve ring with a rubber annulus formed thereon.

In the manufacture of the resilient or flexible connection, flat sheets of metallic material are suitably bent into cylindrical configurations similar to that shown in FIG. 1 to form a plurality of sleeve rings 14. Rubber collars or resilient annuluses 16 are locally adhesively attached or bonded, preferably by vulcanization, one to each sleeve ring 14, in the central region thereof, and, in assembled form, are under compression so as to exert strong pressure against both the inner and outer tubular members 10 and 12. The rubber annuluses 16 are lesser in length than the sleeve rings 14 but are of greater diameter than the inside diameter of the outer tubular member 12. A thin rubber coating 15 is formed on the remainder of the outer surface of the sleeve rings 14 as a result of the vulcanizing process.

Figure 2:
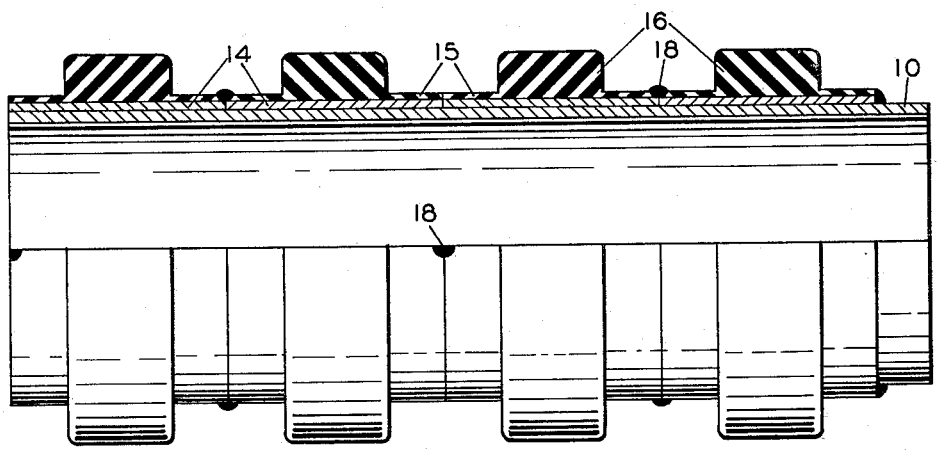
FIG. 2 is an elevation view partly in section showing a plurality of sleeve rings secured to the inner tubular member.

As shown in FIG. 2 a plurality of the sleeve rings 14 are fixedly secured to the inner tubular member by any suitable means, such as spot welds 18. The sleeve rings 14 are aligned in abutting relation on the inner tubular member 10 and secured one to another also by spot welds 18. The number of sleeve rings 14 with their respective resilient annuluses 16 is a matter to be governed by the desired spring or vibration dampening rate. The inner tubular member 10 is telescopically assembled within the outer tubular member 12 by deforming the resilient annuluses 16 and compressing the same between the inner and outer tubular members.

Figure 3:
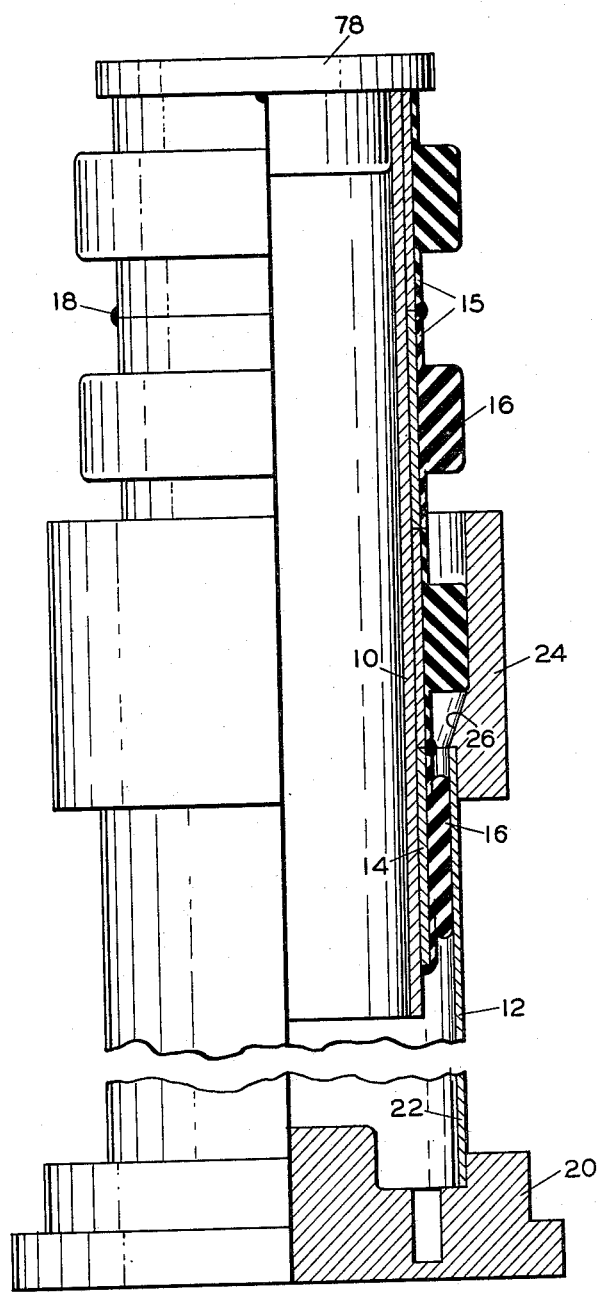
FIG. 3 is a partial longitudinal sectional view showing the inner tubular member with the sleeve rings thereon being telescoped within the outer tubular member by a suitable assembling apparatus.

Suitable apparatus for assembling the members of the flexible coupling is shown in FIG. 3 and includes a base 20 and a work seat formed by an annular recess 22 aligned with the outer tubular member 12. A suitable cylindrical guide or funnel 24 is provided for facilitating the forcing of the resilient annuluses 16 into the outer tubular member 12. The guide 24 is adapted to be mounted upon the upper end of the outer tubular member 12 and is interiorly formed with a downwardly tapered portion 26 having a large diameter of the same size as the normal diameter of the resilient annuluses 16, and having a small diameter of the same size as the inside diameter of the outer tubular member 12.

A piston rod 28 is adapted to cooperate with the upper end of the inner tubular member 10 so that upon operation of the piston rod the inner tubular member will be driven within the outer tubular member. Driving the inner tubular member 10 within the outer tubular member 12 causes the resilient annuluses 16 carried by the inner tubular member to be deformed and compressed between the inner and outer tubular members. As shown in FIG. 4 upon completion of the assembly operation the resilient annuluses 16 are flattened to approximately 50% of their original thickness and are highly compressed so as to exert a strong pressure against both the inner and outer tubular members 10 and 12.

From the foregoing it is apparent that the applicant has supplied a novel structure and method of assembling the same wherein resilient annuluses 16 are individually mounted on sleeve rings 18 and the sleeve rings 18 may be assembled on the inner tubular member 10 in any number to accomplish the desired spring or vibration dampening rate for the flexible connection. Furthermore, since the resilient annuluses 16 are formed on sleeve rings 14 the bulky inner tubular members need not be shipped to an outside source to have the resilient annuluses vulcanized thereto. The individual sleeve rings 14 need merely be welded to the inner tubular member 10 and the welding process can easily be accomplished at the tube making site.

While only a single embodiment of this invention has been shown and described, it is apparent that there may be many changes in structure as well as operation without departing from the scope of this invention as defined by the appended claims.

What I claim is:

1. A resilient connecting means comprising inner and outer telescopically related shafts, a plurality of resilient connecting elements disposed between said inner and outer shafts, each of said plurality of resilient connecting elements comprising a sleeve ring frictionally disposed on said inner shaft, and resilient means secured to each of said sleeve rings and having a free height substantially greater than the space available between said inner and outer shafts, said resilient means on said sleeve rings being spaced from each other when assembled on said inner shaft a sufficient distance to permit unrestricted flow of said resilient means in an axial direction when compressed between said inner and outer shafts to provide a frictional connection with said outer shaft, said individual sleeve rings being of a selected number so that the desired resilient characteristics of the inner and outer shaft assembly is obtained.

2. The resilient connection of claim 1 wherein said sleeve rings are disposed on said inner shaft in abutting relation with each other and are also welded to said inner shaft.

3. The resilient connection of claim 1 wherein said resilient means is a continuous rubber-like annulus, bonded to said sleeve rings.

References Cited in the file of this patent

UNITED STATES PATENTS

| | | |
|---|---|---|
| 1,461,130 | Loughead | July 10, 1923 |
| 2,049,024 | Robertson | July 28, 1936 |
| 2,125,270 | Conover | Aug. 2, 1938 |
| 2,468,985 | Krotz | May 3, 1949 |
| 2,497,921 | Ballard | Feb. 21, 1950 |
| 2,658,261 | Junker | Nov. 10, 1953 |
| 2,691,283 | Stover | Oct. 12, 1954 |
| 2,900,809 | Crankshaw | Aug. 25, 1959 |
| 2,949,021 | Charlesworth | Aug. 16, 1960 |
| 2,962,312 | Wanner | Nov. 29, 1960 |
| 3,012,421 | Cull | Dec. 12, 1961 |